July 4, 1939.     B. FOX ET AL     2,165,044
APPARATUS FOR EVAPORATING AND DISTILLING
Filed June 17, 1936     10 Sheets-Sheet 1

Inventors
B. Fox and
C. Ericson.
By R. S. C. Dougherty
Attorney

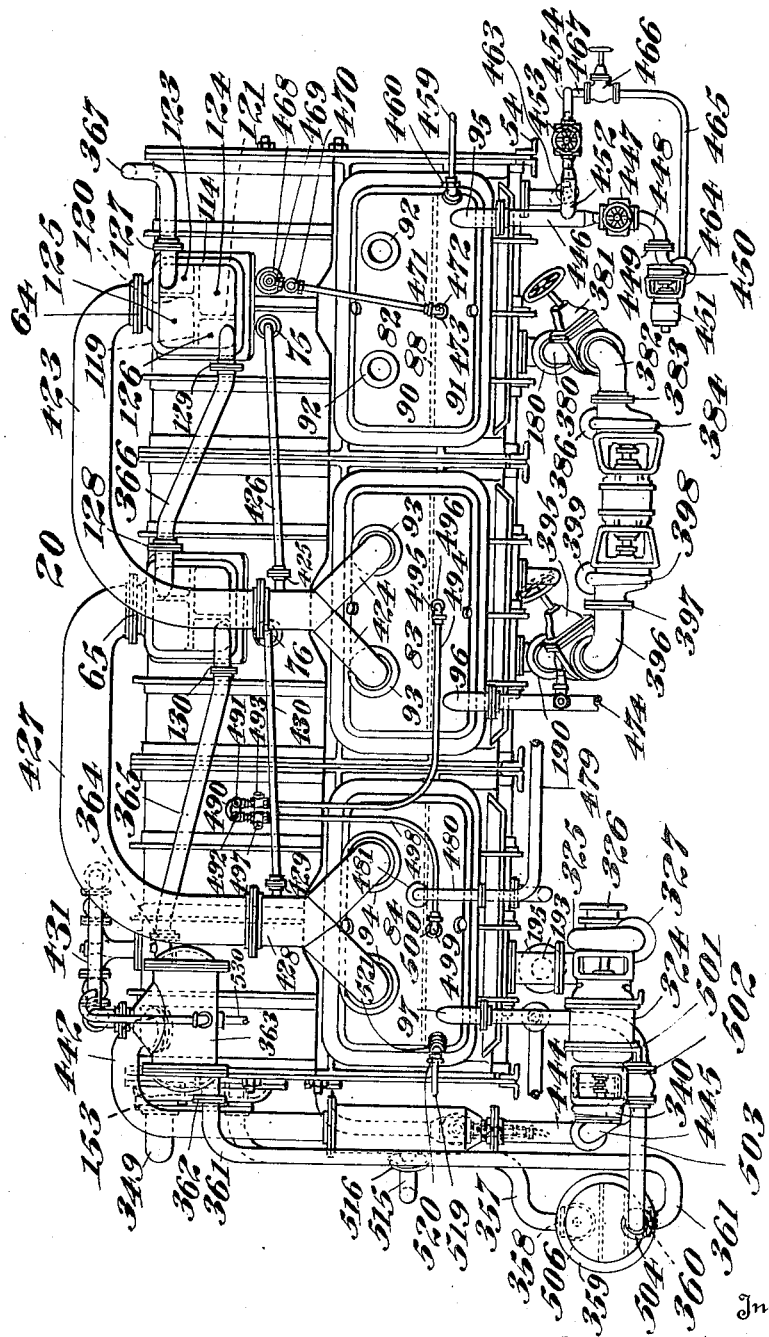

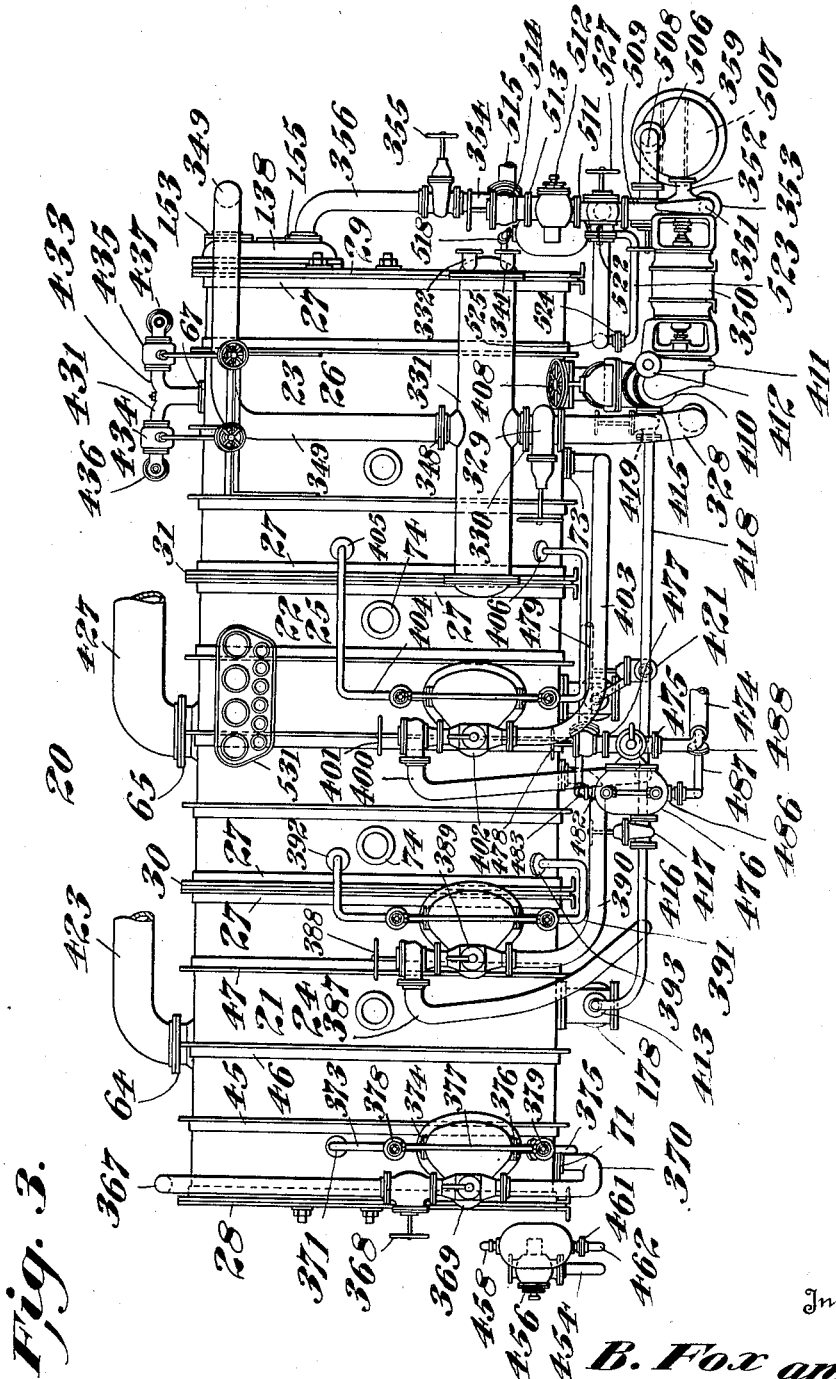

July 4, 1939.   B. FOX ET AL   2,165,044
APPARATUS FOR EVAPORATING AND DISTILLING
Filed June 17, 1936   10 Sheets-Sheet 4
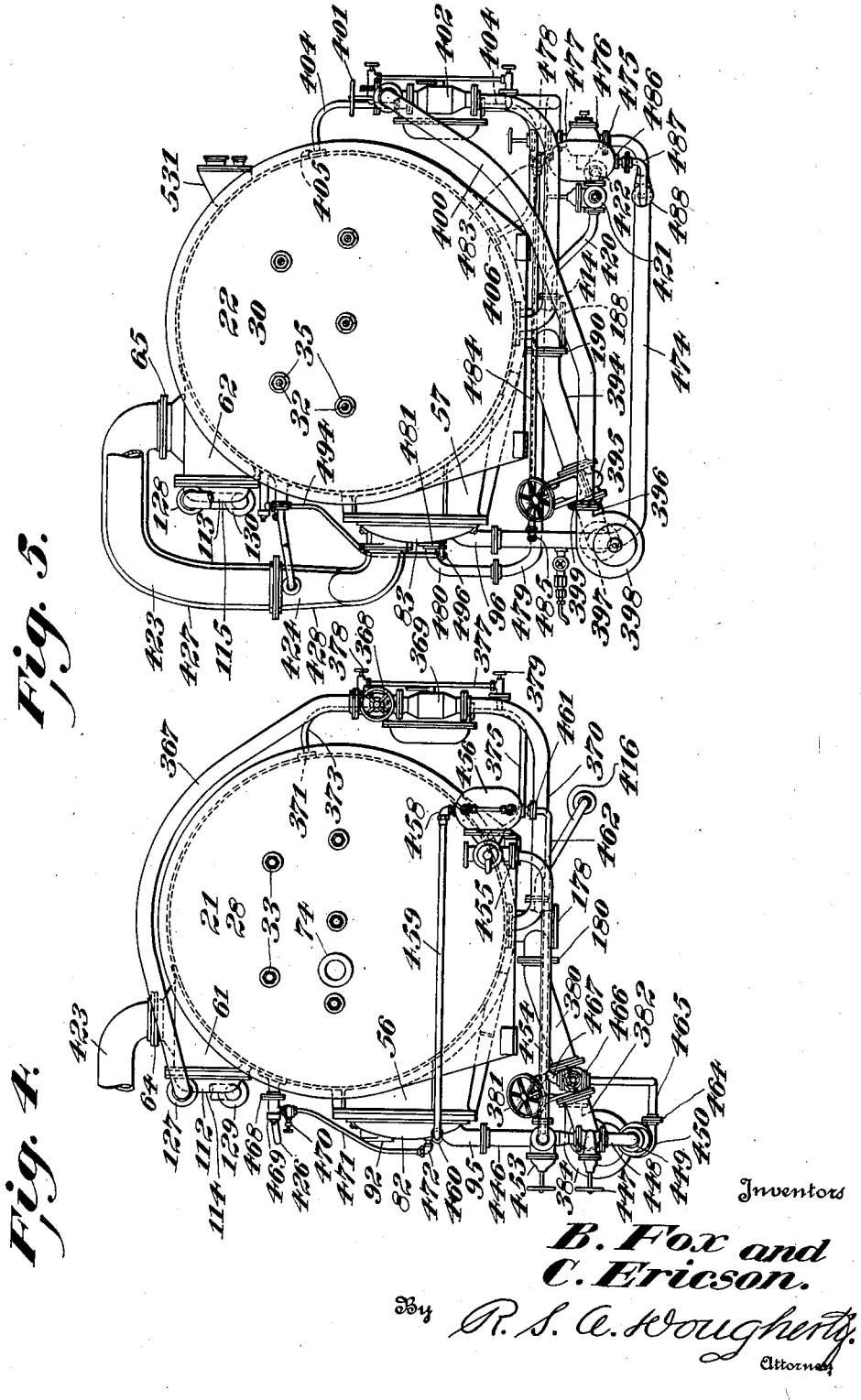

July 4, 1939. B. FOX ET AL 2,165,044
APPARATUS FOR EVAPORATING AND DISTILLING
Filed June 17, 1936 10 Sheets-Sheet 5
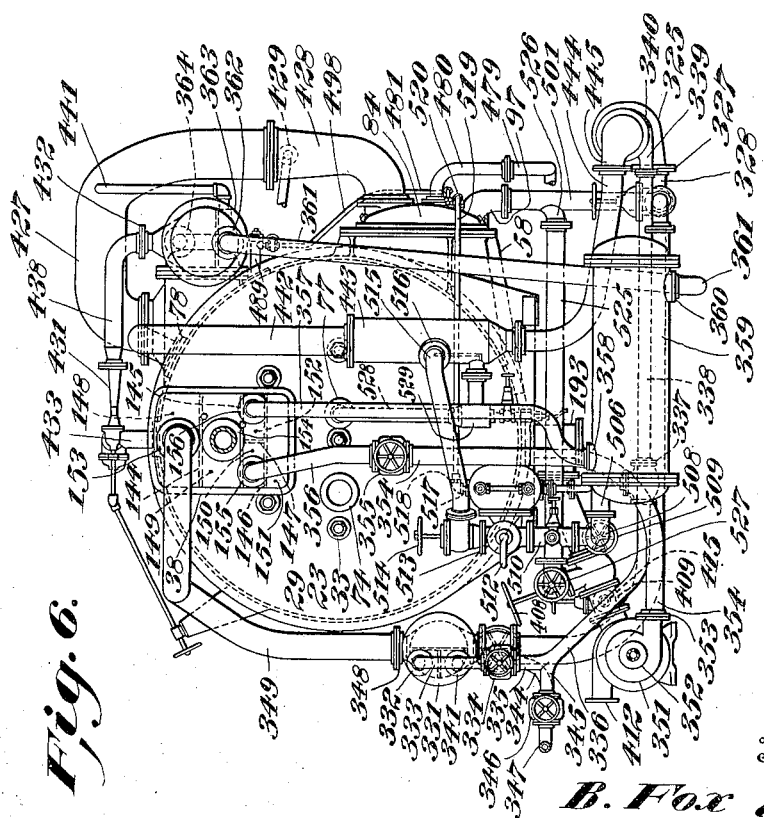

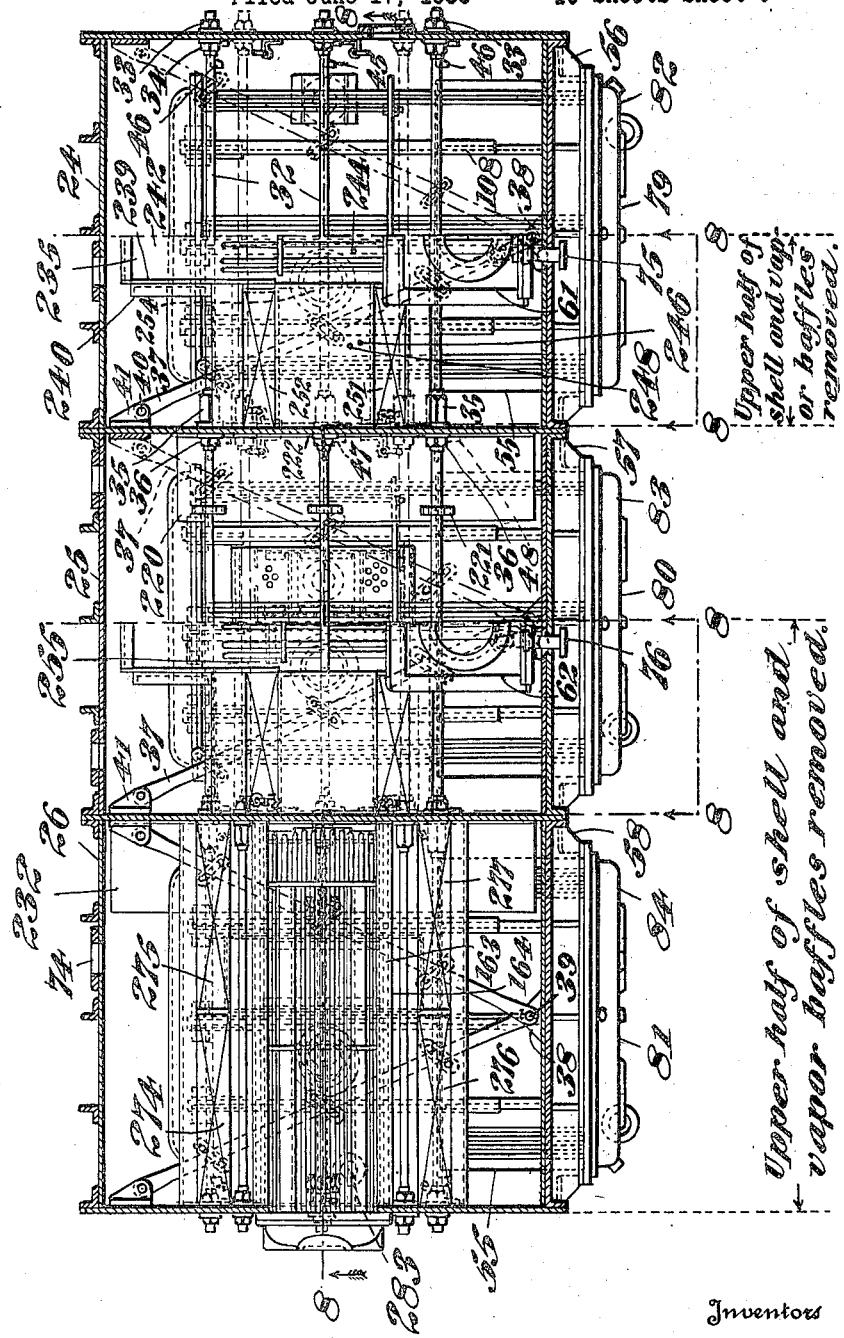

July 4, 1939.  B. FOX ET AL  2,165,044
APPARATUS FOR EVAPORATING AND DISTILLING
Filed June 17, 1936  10 Sheets-Sheet 7
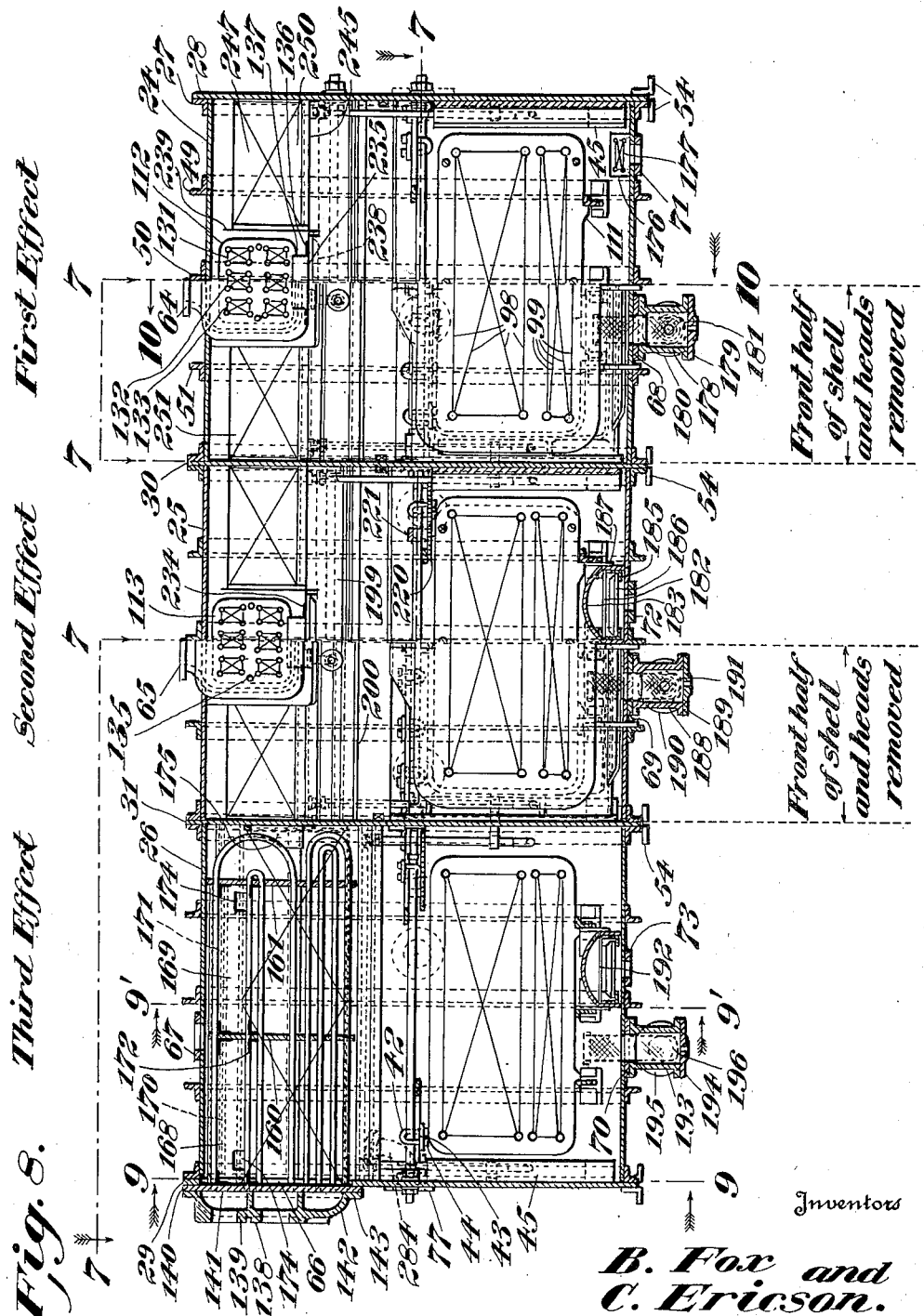
Inventors
B. Fox and
C. Ericson.
By R. S. C. Dougherty
Attorney

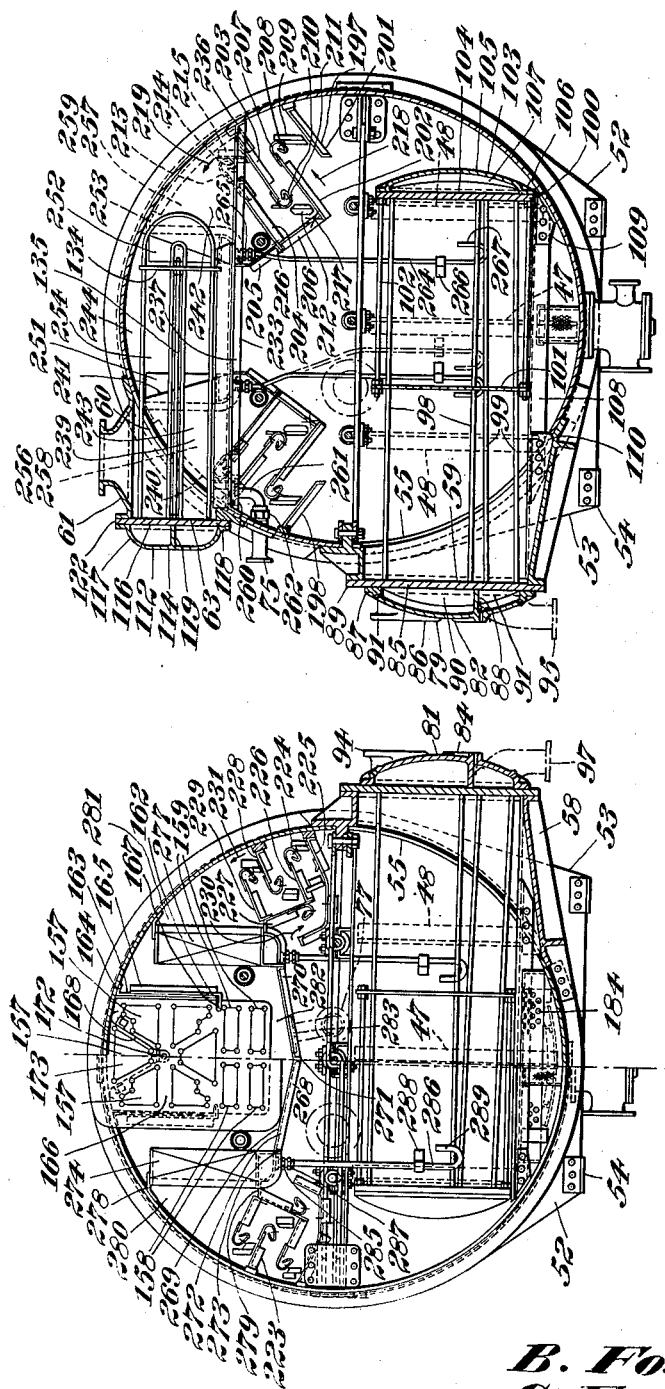

July 4, 1939.   B. FOX ET AL   2,165,044
APPARATUS FOR EVAPORATING AND DISTILLING
Filed June 17, 1936   10 Sheets-Sheet 9
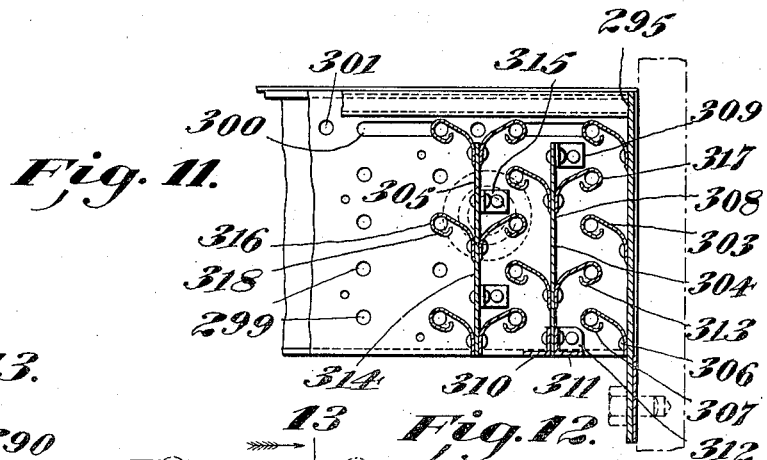
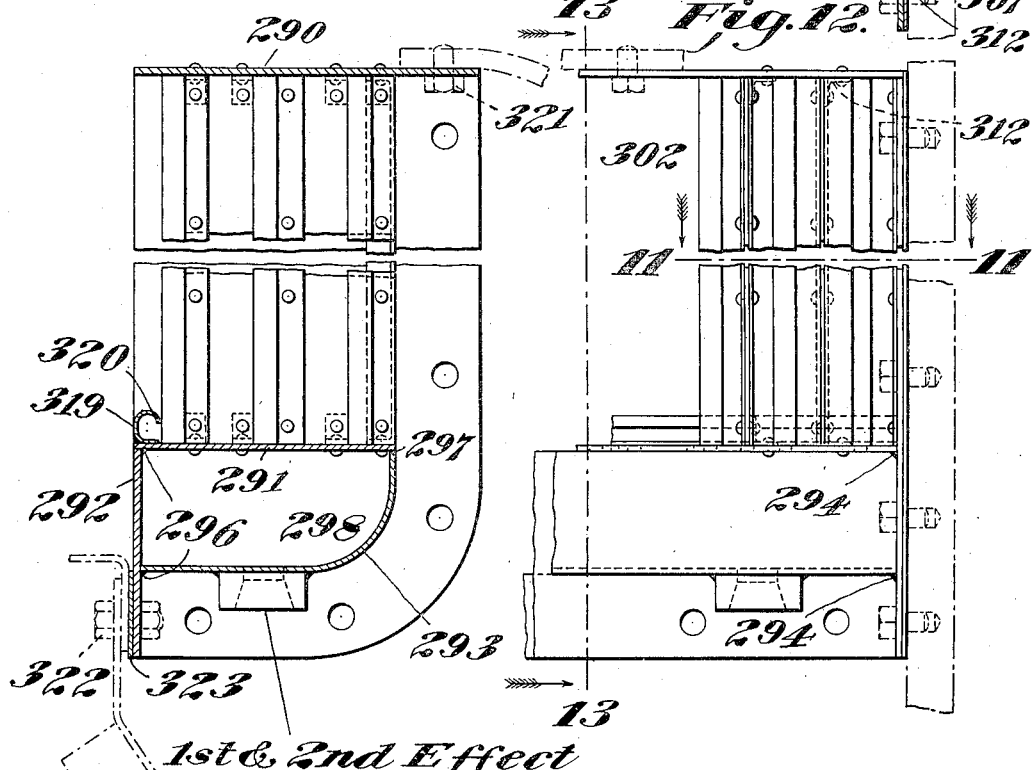
Inventors
B. Fox and
C. Ericson.
By R. S. C. Dougherty.
Attorney

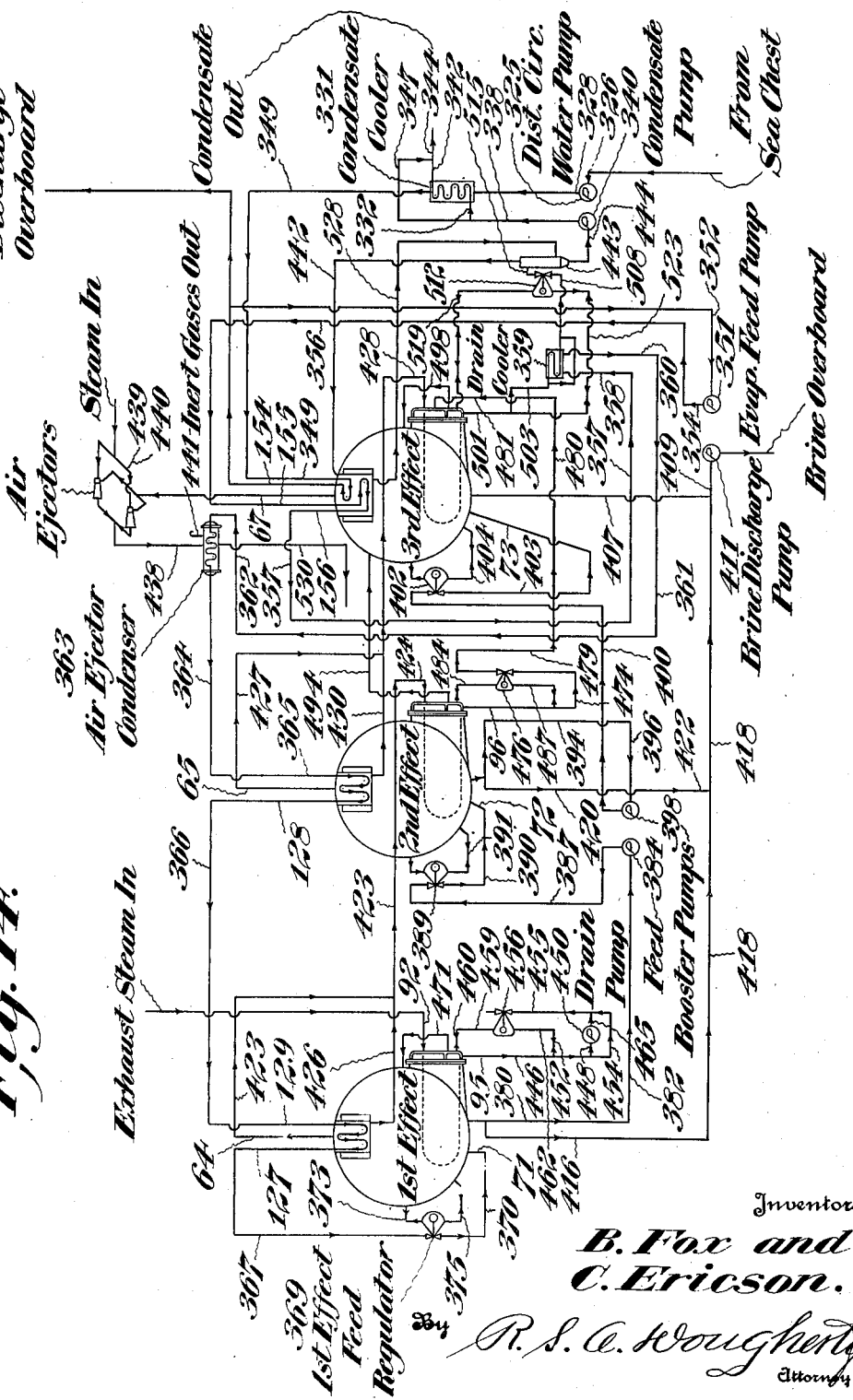

Patented July 4, 1939

2,165,044

UNITED STATES PATENT OFFICE 2,165,044

APPARATUS FOR EVAPORATING AND DISTILLING

Benjamin Fox, Wollaston, and Charles E. Ericson, South Braintree, Mass., assignors to Buena Vista Iron Company, a corporation of New Jersey Application June 17, 1936, Serial No. 85,736

2 Claims. (Cl. 202—174)

This invention relates to an improved apparatus for evaporating and distilling liquids and more particularly to such apparatus for use on board ships and the like where it is necessary to supply the fresh or pure water demands from distilled sea water. Such demands are occasioned by the losses occurring due to the operation of the ship's machinery, such as condenser, turbine, boiler, auxiliary engines, and the like, together with the ship's human needs, such as drinking water.

Heretofore apparatus of this description has comprised a plurality of units in the way of various-stage evaporators, condensers, feed heaters, separators, distillers, and the like, each constituting, to a more or less degree, an individual unit requiring its own container, or casing, together with its piping, and occupying space by itself. Such an arrangement has been very uneconomical, especially on ships, due to its excessive weight and space requirements, and moreover has been inefficient due to its greater exposure of radiation surface in the individual units and connecting piping. Therefore, it is the especial object of our invention to combine the various necessary units required for the evaporation and distilling of sea water in such a compact and efficient manner that there ensues as a result a considerable saving in costs, an increased efficiency of operation, and a reduction in the requirements of those two most important factors in ship design—weight and space.

Other objects and advantages will be apparent from the following description, wherein reference is made to the accompanying drawings illustrating the preferred embodiment of our invention and wherein similar reference numerals designate similar parts throughout the several views.

Fig. 2 is a front elevation thereof.

Fig. 3 is a rear elevation thereof.

Fig. 4 is an outside end elevation of the first effect, or right hand unit, of our apparatus, as viewed from the right hand side.

Fig. 5 is an outside end elevation of the second effect, or middle unit, of our apparatus, as viewed from the right hand side with the first effect unit removed.

Fig. 6 is an outside end elevation of the third effect, or left hand unit, of our apparatus, as viewed from the left hand side.

Fig. 7 is a part horizontal section and part plan view taken along the line 7—7 of Fig. 8, as viewed under conditions as stated on the drawings.

Fig. 8 is a part vertical section and part front elevation taken along the line 8—8 of Fig. 7, as viewed under conditions as stated on the drawings.

Fig. 9 is a combined view—the left half is a view taken along the line 9—9 of Fig. 8 with head plate removed, and the right half is a vertical section taken along the line 9'—9' of Fig. 8, both as viewed in the direction of the arrows.

Fig. 10 is a vertical section taken along the line 10—10 of Fig. 8, as viewed in the direction of the arrows.

Fig. 11 is a section taken along the line 11—11 of Fig. 12.

Fig. 12 is a front elevation of a portion of a vapor separator.

Fig. 13 is a section taken along the line 13—13 of Fig. 12.

Fig. 14 is a diagrammatic layout of our apparatus in an operating condition depicting the flow of liquids and gases therethrough.

Figure 1:
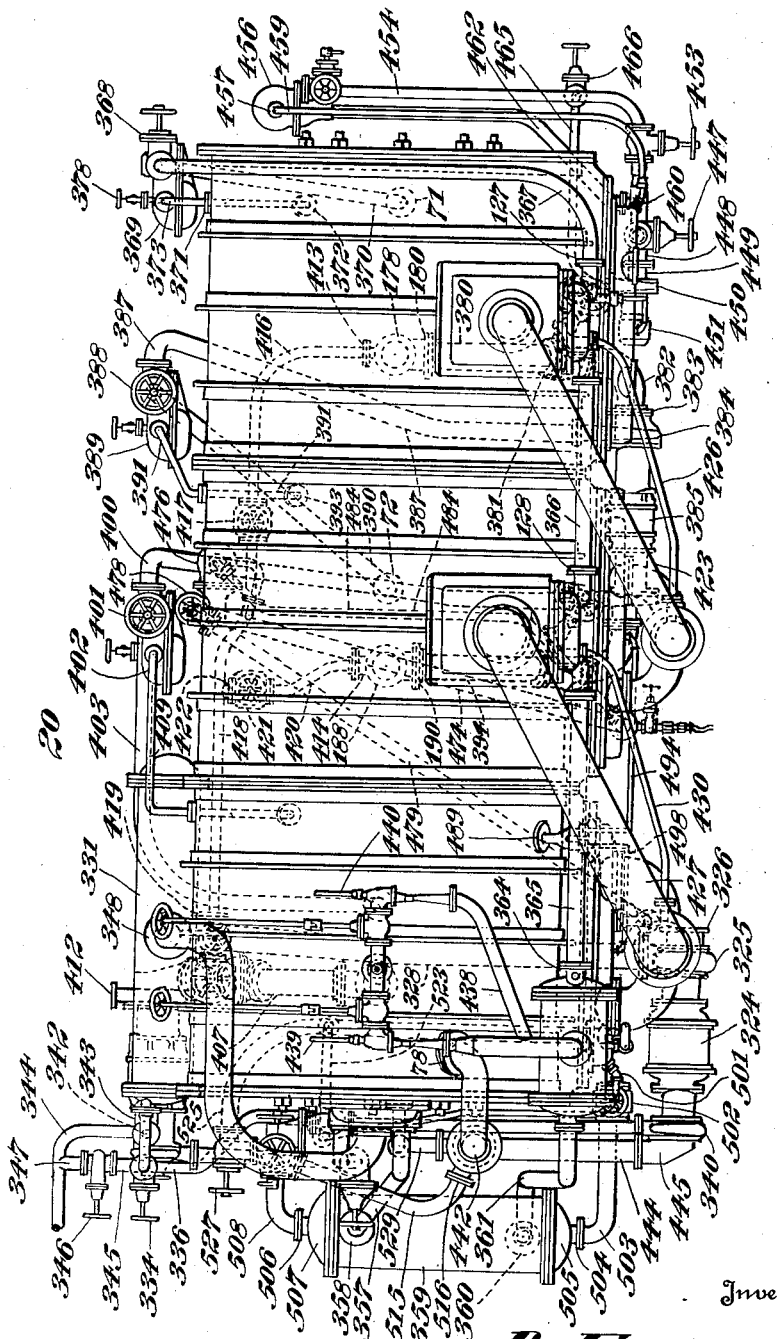
Fig. 1 is a plan view of our improved apparatus.

Referring now to the drawings, and more particularly for the present to Figs. 7 to 10 inclusive the numeral 20 designates the evaporating and distilling apparatus comprising a plurality of units, or individual effects, of a multi-effect evaporator. We have shown in the drawings a triple effect evaporator comprising the three horizontally disposed cylindrical units indicated by the reference numerals 21, 22, and 23, which we will further respectively designate as the first, second, and third effect. The number of effects may be increased or decreased as is well known in the art, depending upon the degree of efficiency or of production desired, as long as the change occurs between units equivalent to the first and the third effects herein shown. As shown each effect comprises an outer cylindrical casing 24 or 25 or 26 preferably having at each end flanges 27 attached to the casing by suitable fastening means such as rivets. It will be noted that the casings 24, 25, and 26 of the different effects are placed together in a horizontal end-to-end relationship having closing wall plates at each end of each casing. Casings 24 and 26 have at their outer ends the wall plates 28 and 29 respectively, while between the casing 24 and the casing 25 is the common wall plate 30, and between the casing 25 and the casing 26 is the common wall plate 31. The flanges 27 and the wall plates 28 to 31, inclusive, have provisions for suitable fastening means such as bolts, whereby the casings and the wall plates may be rigidly joined together in an end-to-end relationship. For further strengthening and maintaining this end-to-end relationship longitudinally disposed stay bolts 32 piercing the wall plates pass through the apparatus 20 from one end to the other. The bolts 32 are threaded in the vicinity of the wall plates and they are fixed in the end wall plates 28 and 29 by means of nuts 33 and 34, and they are also fixed where they pass through the common wall plates 30 and 31 by means of nuts 35 and 36. It will be noted that when the said nuts are all properly adjusted the stay bolts 32 act both in tension and in compression to give rigidity and strength to each of the effects individually and to the apparatus as a whole. For convenience the stay bolts may be made sectional by dividing within the long nuts 35. The different units 21, 22, and 23 are still further strengthened and braced individually and collectively by brace members 37. The brace members 37 are positioned as horizontal diagonally disposed members, two to each effect. One end of each brace 37 is attached to a centrally disposed lug 38 on the evaporator tube nest shell extension (to be described hereinafter) by means of bolts 39, while the opposite ends are attached to their respective wall plates by means of bolts 40 through the brackets 41 fixed on the inside faces of their respective wall plates. U clamps 42, together with straps 43 and nuts 44, placed about the stay bolts 32 and the braces 37 at their points of intersection, act as additional bracing members. Also bulb angles 45 and 46 suitably attached by means such as by riveting, bolting, or welding (not shown) to the inside of the end wall plates 28 and 29, and angles 47 and 48 similarly attached to the wall plates 30 and 31 add still further strength of rigidity to the apparatus 20. Additional circumferential strengthening of each of the casings 24, 25, and 26 is obtained by means of the angles 49, 50, and 51 shown suitably attached to the casings and to the evaporator tube nest shell extension.

For supporting the apparatus 20 on a foundation, each of the wall plates 28 to 31, inclusive, extend beyond the flanges 27 at the bottom to form foot extensions 52 and 53 to which are suitably attached the foundation brackets 54.

When viewed from the front each of the casings 24, 25, and 26 have in the lower half thereof substantial openings 55 communicating with their interior. Exterior to and surrounding the openings 55 in each of the casings 24, 25, and 26 respectively, are the evaporator tube nest shell extensions 56, 57, and 58. These shell extensions are attached to the casings by any suitable means such as by riveting, bolting, or by welding. These shell extensions 56, 57, and 58 are preferably metallic castings suitably reenforced by ribs and flanges and each extend outward from their respective casing to form a vertically disposed finished flanged face 59 to which is attached a heating means, as will hereinafter be described.

In the front upper half of each of the casings 24 and 25 are substantial openings 60 communicating with their interior. Exterior to and surrounding these openings 60 in each of the casings 24 and 25, respectively, are the vapor feed heater tube nest shell extensions 61 and 62. These shell extensions are securely attached to the casings by any suitable means such as by riveting, bolting, or by welding. These shell extensions 61 and 62 are preferably metallic castings suitably reenforced by ribs and flanges, and each extend outward from their respective casings to form a vertically disposed finished flanged face 63 to which is attached a condenser means as will hereinafter be described. A horizontally disposed finished flanged face on the top of each of the shell extensions 61 and 62, respectively, forms outlets 64 and 65.

The outside wall plate 29 of the third effect is provided in its upper central portion with the substantial opening 66 communicating with its interior. Exterior to this opening is mounted a tube nest plate and cover head to be described hereinafter.

In the top of the casing 26 of the third effect is provided a flanged opening 67 which communicates with the interior of the casing for a purpose hereinafter disclosed.

In the bottoms of the casings 24, 25, and 26 are provided flanged openings 68, 69, and 70, and 71, 72, and 73, all of which communicate with the interior of their respective casings for purposes hereinafter to be described.

In each of the effects two observation windows 74 are provided. These windows comprise glass covered openings, suitably mounted, by means of which a view of the interior of the effects may be obtained. In the first and third effect one of these windows is mounted in the rear of each one of the casings 24 and 26, and one is mounted in each one of the end wall plates 28 and 29, while in the second effect two windows are mounted in the rear of the casing 25.

In the front upper half of each one of the casings 24 and 25 and just below the openings 60 therein is suitably mounted a flanged extension pipe designated respectively by the numerals 75 and 76. These extension pipes communicate with the interior of their respective casing for a purpose hereinafter described.

In the third effect outside wall plate 29 near its center is a flanged opening 77 (shown in dotted lines in Fig. 9) which communicates with the interior of the casing for a purpose hereinafter described. In the upper part of the third effect casing 26 near the outer end is a flanged outlet 78 communicating with the interior of the casing for a purpose hereinafter described.

Contained within the lower half of each of the casings 24, 25, and 26, and disposed transversely thereto, respectively, are evaporator heaters 79, 80, and 81. These heaters are each integral units and are removably attached as such to the flanged face 59 of their respective shell extensions 56, 57, and 58. They are practically identical in construction with the exception of the heads 82, 83, and 84 which because of piping variations are slightly different one from each other. Therefore the description of one will suffice for the others and the reference numerals will be applied preferably to that one 79 of the first effect. The heads 82, 83, and 84 are preferably made of metallic castings having a finished face 85, a curved outer wall 86 with integral peripheral flanges 87, and a horizontally disposed wall 88. Each head 82, 83, and 84, is suitably removably attached to a tube sheet 89 wherewith the horizontal wall 88 forms two enclosed chambers 90 and 91. Communicating with chamber 90, in each case, are two flanged openings which in the different heads 82, 83, and 84 are respectively designated as 92, 93, and 94. Communicating with chamber 91, in each case, is a flanged outlet extension which in the different heads 82, 83, and 84 are respectively designated as 95, 96 and 97. An upper nest of tubes 98, communicating with chamber 90, and a lower nest of tubes 99, communicating with chamber 91, extend from the front tube sheet 89 to a rear tube sheet 100 and are supported intermediate the ends by a supporting tube sheet 101. The latter is held in spaced relation to the rear tube sheet 100 by suitable means such as the bolts 102. A rear cover head 103 is removably attached by suitable fastening devices (such as bolts not shown) to the rear tube sheet 100. The cover head is preferably made of a metallic casting having a finished face 104, and a curved outer wall 105 with an integral peripheral flange 106, and forms with the rear tube sheet 100 a chamber 107 with which the rear ends of all the tubes 98 and 99 communicate. For supporting the rear end of the heater unit and for convenience in removing for the purpose of cleaning and repairing, the tracks 108 are provided, suitably mounted to their respective casing by means of the brackets 109 and to their respective shell extensions by means of the rib 110. The tracks 108 support and form a slide for both the supporting tube sheet 101 and for the rear tube sheet 100 and these are held sidewise and guided upon movement by integral lugs 111 thereon. The lower nest of tubes 99 is sloped toward the front end to aid in the discharge of condensates.

Contained within the upper part of the casings 24 and 25 and disposed transversely thereto, respectively, are vapor feed heater units 112 and 113. These heaters are each integral units and are removably attached as such to the flanged face 63 of their respective shell extensions 61 and 62. They are practically identical in construction with the exception of the heads 114 and 115 which because of piping variations are slightly different one from the other. Therefore the description of one will suffice for both and the reference numerals will be applied preferably to 112 of the first effect except where different numbers are used. The heads 114 and 115 are each preferably made of a metallic casting having a finished face 116, a curved outer wall 117 with integral peripheral flanges 118, a horizontally disposed wall 119, and vertically disposed walls 120 and 121 (see Fig. 2). Each head (114 and 115) is removably attached (as by bolts not shown) to a tube sheet 122 whereby the walls 119, 120, and 121 form four enclosed chambers 123, 124, 125, and 126 (see Fig. 2). Communicating with chamber 123, in each case, is a flanged opening which in the different heads 114 and 115 are respectively designated as 127 and 128. Communicating with chamber 126, in each case, is a flanged opening which in the different heads 114 and 115 are respectively designated as 129 and 130. There are three groups or nests of tubes attached to the tube sheet 122, each tube of which is U-shaped with its upper and lower branches fixed in the upper and lower halves respectively of the tube sheet 122. In the first nest of tubes 131, each tube communicates chamber 123 with the right half of chamber 124. In the second nest of tubes 132, each tube communicates the left half of chamber 124 with the right half of chamber 125. In the third nest of tubes 133, each tube communicates the left half of chamber 125 with chamber 126. All the tubes 131, 132, and 133 are supported near their rear loop by means of a rear tube sheet 134 which is held in spaced relation to the front tube sheet 122 by suitable means such as the bolts 135. For supporting the rear end of the heater units (112 and 113) and for convenience in removing for the purpose of cleaning and repairing, the tracks 136 are provided. The tracks 136 are suitably mounted on structure relating to separators hereinafter described. The tracks 136 support and form a slide for the supporting tube sheet 134 which is held sidewise and guided upon movement by means of integral lugs 137 thereon.

Contained within the upper part of the casing 26 and disposed longitudinally thereto is the distilling condenser and feed heater combined unit 138. The unit 138 comprises an outer head 139 and a tube nest plate 140 which are suitably adapted for removable attachment to the outer face of the wall plate 29 and act to close the opening 66. The head 139 is preferably made of a metallic casting having a finished face 141, a curved outer wall 142 with integral peripheral flanges 143, horizontally disposed walls 144, 145, and 146 (see Fig. 6), and a vertically disposed wall 147. The head 139 by reason of its said walls 144 to 147, inclusive, in conjunction with the tube nest plate 140, forms five enclosed chambers 148, 149, 150, 151, and 152 (see Fig. 6). Communicating with the chamber 148 is a flanged opening 153—with the chamber 149 is a flanged opening 154—with the chamber 150 is a flanged opening 155—and with the chamber 152 is a flanged opening 156. There are three groups, or nests of tubes, attached to the tube nest plate 140, each tube of which is U-shaped having an upper and a lower branch with their ends fixed in the plate 140. In the first, or distilling condenser nest of tubes 157, each tube communicates the chamber 148 with the chamber 149. In the second nest of tubes 158 called the feed heater first pass tubes, each tube communicates the chamber 150 with the left half of chamber 151. In the third nest of tubes 159, called the feed heater second pass tubes, each tube communicates the right half of chamber 151 with the chamber 152. All the tubes 157, 158, and 159 are supported by means of an intermediate support plate 160 and rear support plate 161. For supporting the rear end of the unit 138, and for convenience in removing for the purpose of cleaning and repairing, angle tracks 162 are provided. The tracks 162 are suitably attached at their ends to the wall plates 29 and 31 and to the lower edges of the curtain walls 163. The curtain walls 163 extend full length on each side of the distilling condenser nest of tubes 157 and are suitably attached along their upper flanged edges 164 to the casing 26, and are suitably attached along their vertical end flanged edges 165 to the wall plates 29 and 31. It will be noted that the curtain walls 163 act in conjunction with the casing 26 and the wall plates 29 and 31 to form a chamber 166 open on the bottom and enclosing the nest of tubes 157. Notches 167 in the plates 160 and 161 guide the unit 138, upon removal, along the tracks 162. Mounted within the nest of tubes 157 are the air baffles 168 and 169. The baffle 168 extends along the tubes 157 from the tube plate 140 to the support plate 160 while the baffle 169 extends along the tubes 157 from the support plate 160 to the support plate 161. The baffle 168 is supported near its upper edges on the angled supports 170 which are suitably attached at their ends to the plates 140 and 160, while the baffle 169 is similarly supported on the angled supports 171, which are similarly attached to the plates 160 and 161. In addition the baffles are also supported on their ends at the bottom by angled brackets 172 suitably attached to the respective adjacent plates 140, 160, and 161. It will be noted that the baffles 168 and 169 are V-shape in transverse cross section and when assembled in place act in conjunction with the casing 26 and the plates 140 and 161 to form a triangular shaped chamber 173 divided near its mid-length by the plate 160. In this manner it will be noted that a portion of the tubes 157 enclosed within the upper half of the chamber 166 are further enclosed within the chamber 173. Air ports 174 are provided in the baffles 168 and 169 near the ends of the chamber 173 in order to communicate the chamber 173 with the chamber 166. Also the chamber 173 is communicated with the exterior of the casing 26 by means of the flanged opening 67. Acting in conjunction with the nest of tubes 157 but not movable therewith is the baffle 175 suitably attached to the wall plate 31. This baffle 175 is formed to contact a portion of the U end of the nest of tubes 157 when the latter are assembled in the apparatus 20. Care is taken to assure that chamber 173 is as vapor tight as practicably may be so that communication between chambers 173 and 166 is by way of the air ports 174.

Within the casing 24 of the first effect 21 and covering on the inside the flanged opening 71 is the first effect feed distributing box 176 suitably attached to the casing 24 and provided with a large number of strainer holes 177. Suitably attached to the flanged opening 68 in the bottom of the casing 24 is the strainer box 178 having a suitably attached cover plate 179, and an outlet 180. Enclosed within the strainer box and extending upward through the flanged opening 68 is a strainer 181. Within the casing 25 of the second effect 22 and covering on the inside the flanged opening 72 is the second effect feed distributing box 182 comprised of a dished and flanged plate 183 perforated by holes 184 and suitably braced and reenforced by angles 185 and 186. The box 182 is held in position by means of mounting straps 187 suitably attached to the box 182 and to the tracks 108. Suitably attached to the flanged opening 69 in the bottom of the casing 25 is the strainer box 188 having a suitably attached cover plate 189, and an outlet 190. Enclosed within the strainer box and extending upward through the flanged opening 69 is a strainer 191. Within the casing 26 of the third effect 23 is the third effect feed distributing box 192 covering the flanged opening 73 in a similar manner to and with similar structure as for the box 182 described for the second effect hereinabove and need not be further described. Suitably attached to the flanged opening 70 in the bottom of the casing 26 is the strainer box 193 having a suitably attached cover plate 194, and an outlet 195. Enclosed within the strainer box and extending upward through the flanged opening 70 is a strainer 196.

Within the casing 24 of the first effect 21 and extending longitudinally thereof from wall plate 28 to wall plate 30 are the vapor baffle nests 197 and 198. The two being identical except as to hand the description of one will suffice for the other.

Furthermore, since vapor baffle nests practically identical in structure and location are provided within the casing 25 of the second effect 22, these will need no further description or reference numerals other than the group numerals 199 and 200 corresponding respectively to the group numerals 197 and 198 of the first effect. The vapor baffle nest 197 comprises a series of baffle sheets 201 to 206, inclusive, which extend from wall plate 28 to wall plate 30 and are suitably attached thereto. Baffle sheet 201 is disposed in an upwardly sloping position with its upper longitudinal edge suitably attached to the casing 24. Baffle sheet 202 is positioned at the same height as sheet 201 and parallel thereto and has attached along its upper edge a trough 207 having orifices 208 adjacent the wall plates 28 and 30. Connecting the trough 207 to the sheet 201 at intervals are connecting brackets 209 which act as ties and give added rigidity to the parts. Baffle sheet 203 lies above the baffle sheet 202 and is parallel thereto, and is suitably attached along its upper longitudinal edge to the casing 24, while attached to its lower longitudinal edge is the trough 210 provided with orifices 211 adjacent the wall plates 28 and 30. Connecting the trough 210 to the baffle sheet 202 at intervals are connecting brackets 212. Baffle sheet 204 is positioned at the same height as sheet 203 and is parallel thereto. Attached along the upper edge and at the ends of the baffle 204 are a pair of troughs 213 each with an orifice 214 adjacent the wall plates 28 and 30. The space intermediate the opposed ends of the troughs 213 is occasioned by a structure to be hereinafter described. The trough 213 is connected at intervals to the sheet 203 by means of connecting brackets 215. Baffle sheet 205 is positioned at right angles to the baffle sheet 204—the lower edges of both being suitably attached one to the other and thus form a trough provided with orifices 216 adjacent the wall plates 28 and 30, while the upper edge of the baffle sheet 205 is suitably attached to structure forming vapor separators hereinafter described. In line with and below the baffle sheet 205 is the baffle sheet 206 suitably attached along its upper edge to the lower edge of the baffle sheet 205. The lower edge of the baffle sheet 206 is suitably attached to the baffle sheet 202 and forms with it a trough provided with orifices 217 adjacent the wall plates 28 and 30. It will be noted that the baffle sheets 201 to 206, inclusive, together with their associated parts as above described form a tortuous but open passageway having an inlet 218 extending the full length between the baffle sheets 201 and 202, and having two outlets 219, each the length of the troughs 213.

Also within the second effect is provided adjacent the wall plate 30 a spray baffle 220 comprising mounting clamps 221, by means of which it is secured to certain of the stay bolts 32, and flange 222 by means of which it is suitably attached to the wall plate 30.

Within the casing 26 of the third effect 23 are the vapor baffle nests 223 and 224 which due to similarity in location and construction to the vapor baffles nests 197 and 198 respectively need not be fully described and designated to be thoroughly understood. The baffle nest 224 comprises baffle sheets 225 to 229 together with suitable troughs with orifices, and connecting brackets. Here, both the baffle sheets and troughs all extend full length between the wall plates 31 and 29 to which they are suitably attached. In manner similar to baffle nests 197 and 198 there is formed a tortuous but open passageway having an inlet 230 extending full length between the baffle sheets 225 and 227, and an outlet 231 extending full length between the baffle sheet 228 and the trough on the baffle sheet 229. Also within the third effect is provided adjacent the wall plate 31 a spray baffle 232 similar in construction to the spray baffle 220 as described for the second effect and this one therefore need not be further described to be thoroughly understood.

Within the upper part of each of the casings 24 and 25 and disposed therein to either side of and below their respective vapor feed heaters 112 and 113 is a unitary structure that may broadly be designated as the vapor separator (233 and 234 respectively for the first and second effects). Since the structure and location of the different elements is practically identical in each effect the description of the one for the first effect will suffice for that of the second, except as to reference numerals, where for convenience in describing the operation of the apparatus 20 hereinafter different numerals may be assigned for similar parts in the different effects. The vapor separator 233 in the first effect 21 comprises the following elements:

Within the upper part of the casing 24 of the first effect 21 (delineated particularly in Fig. 10) is a flanged plate 235 extending transversely across the central portion of the casing and suitably attached at its ends by the flanges 236 to the casing 24. This plate 235 sets off a segment of the casing 24 within which the feed heater 112 is disposed. This plate 235 comprises downwardly extending longitudinal side flanges 237 and is further strengthened and reenforced by means of four transverse angles 238. The two center ones of these angles support by suitable attachment the mid-portions of the hereinabove described baffle sheets 205. Thus it is seen that the plate 235 forms a floor beneath the feed heater 112. Extending upward from each side at each end of the plate 235 are side wall plates 239. These side wall plates 239 are triangularly shaped and each is suitably attached along its lower edge to a side flange 237 of the plate 235, and along its circumferential edge it is suitably attached to the casing 24 through the medium of an angle 240, while its third edge 241 is free and extends downwardly from the casing 24 while sloping inwardly to the plate 235. It will be noted that the floor plate 235 together with the side wall plates 239 and the casing 24 now form two triangularly shaped chambers 242 and 243. The chamber 242 is open on its side facing the vertical center line of the casing 24 and the rear part of the tube nests of the vapor feed heater 112 extends partially thereinto. The chamber 243 too is open on its side facing the vertical center line of the casing 24, and also is open on its circumferential side by reason of its conjunction with the opening 60 in the casing 24. The forward parts of the tubes of the vapor feed heater 112 extend through the chamber 243. For purposes of this description the intervening space between the open ends of the chambers 242 and 243 and above the plate 235 will be designated as chamber 244 although it has no vertical side enclosing walls. Extending from the wall plate 28 to the side flanges 237 of the plate 235, to each of which it is suitably attached, and transversely traversing the space between the upper edges of the baffle sheets 205 and to each of which it is suitably attached, is the plate 245. Also on the opposite side, extending from the side flanges 237 of the plate 235 to the wall plate 30, and between the upper edges of the baffle sheets 205, and similarly attached, is the plate 246. Between these plates 245 and 246 and those portions of the casing 24 directly thereabove the spaces so formed will be designated, for the purposes of this description, as chambers 247 and 248, respectively.

Within the upper part of the casing 24 of the first effect 21 and comprising parts of the vapor separator 233 are four vapor separators proper designated by the numerals 249 to 252, inclusive. As shown in Figs. 7 and 8 they are represented conventionally as rectangular areas with diagonally crossed lines, and in Figs. 11, 12, and 13 their detail structure is shown and will hereinafter be described. These vapor separators proper 249 to 252, inclusive, are suitably attached along their upper outside edge to their adjacent casings by means of plate connections 253. Referring to Figs. 7, 8, and 10 there has been so far described, as forming portions of a segment in the upper part of the casing 24, the chambers 242, 243, 244, 247, and 248, which seen in a plan view form roughly a Greek cross but which actually comprises a chamber in itself and which we will now designate as feed heater chamber 254 in the first effect 21, and as heater chamber 255 in the second effect 22. The four remaining corner portions of the segment will, for purposes of this description, be designated as chambers 256 to 259, inclusive. Chamber 256 lies parallel to chamber 243 and has in common therewith the wall formed by its adjacent one of the side wall plates 239, and as an opposite wall thereto the wall plate 28, for its circumferential wall it has the casing 24. The vapor separator 249 forms the side facing the vertical center line of the casing 24 while the bottom is closed by that portion of the vapor baffle nest 197 that lies directly beneath except that it is in communication with the tortuous passageway thereof through the adjacent one of the outlets 219. Therefore, chamber 256 may be described briefly and accurately as comprising a chamber closed except for an adjacent communicating outlet 219 of the baffle nest 197 and a communicating outlet to the chamber 254 through the vapor separator 249. It is thought that by reason of similar construction, location, and function it will now be sufficient to describe the remaining chambers 257, 258, and 259 in like manner. Chamber 257 is a closed chamber except for an adjacent communicating outlet 219 of the baffle nest 197 and a communicating outlet to the chamber 254 through the vapor separator 250. Chamber 258 is a closed chamber except for an adjacent communicating outlet 219 of the baffle nest 198 and a communicating outlet to the chamber 254 through the vapor separator 251. Chamber 259 is a closed chamber except for an adjacent communicating outlet 219 of the baffle nest 198 and a communicating outlet to the chamber 254 through the vapor separator 252.

Adjacent the left hand end of the plate 235 of Fig. 10 is a flanged opening 260 to which is suitably attached a pipe connection 261. A pipe union coupling 262 connects the pipe connection 261 to a boss on the inside of the flanged extension pipe 75 in the case of the first effect and to the flanged extension pipe 76 in the case of the second effect. By these means extension pipe 75 is communicated with the chamber 254, and extension pipe 76 is communicated with the chamber 255.

Each of the vapor separators 249, 250, 251, and 252 is provided with a flanged opening 263 in its bottom in close proximity to its adjacent wall plate, and suitably attached to which is a pipe 264 by means of a pipe union coupling 265. The pipe 264 in each case is suitably attached to its adjacent wall plate by means of a clamp bracket 266. The lower end of the pipe 264 ends in a U to form a trap 267.

Within the upper part of the casing 26 and disposed therein to either side of and below the distilling condenser and feed heater unit 138 is a unitary structure that may be broadly designated as the third effect vapor separator 268.

This vapor separator comprises the following elements: Extending full length from wall plate 31 to wall plate 29 just beneath the tube nests 158 and 159, respectively, are the downwardly flanged floor plates 269 and 270. The plates 269 and 270 are suitably attached to each other, along the center line of the casing 26, in a shallow V relationship by means of the inside flanges 271, and are suitably attached to their respective wall plates by the end flanges 272, and along their outside flanges 273 they are suitably attached to their respective adjacent vapor separator units 274, 275, 276, and 277, two each of which are disposed to each side of the unit 138. In Figs. 7, 8, and 9 the vapor separator units 274 to 277, inclusive, are represented conventionally as rectangular areas with diagonally crossed lines. Their detail structure as separator units is practically identical to that described in connection with Figs. 11, 12, and 13 for the vapor separators 249 to 252, inclusive, except for certain variations in dimensions and in the attaching means, for this reason they need not be further described or designated in order to be clearly understood. The vapor separator units are suitably attached to each other in pairs, 274 to 275, and 276 to 277, and thus arranged on either side of unit 138 they extend full length between the wall plates 29 and 31 and are suitably attached thereto, and coextensive with their top outer edges they are additionally suitably attached to the casing 26 by means of the plate connections 278. It will be noted that the baffle sheets 227 of the vapor baffle nests 223 and 224 are suitably attached along their upper edge 279 full length between the wall plates 29 and 31 to the paired vapor separator units.

It will now be noted that between the paired vapor separators and their respective adjacent portions of the casing 26 are formed triangular shaped chambers 280 and 281 closed on their ends by the wall plates 29 and 31 and on their bottoms by the underlying vapor baffle nests 223 and 224, respectively, except for the tortuous passageway outlets 231. Furthermore, it will be noted that between the paired vapor separator units as sides, and the wall plates 29 and 31 as ends, and the casing as a top, and the plates 269 and 270 as a bottom, there is formed a chamber 282 within which extends the tube nests 157, 158, and 159 of the distilling condenser and feed heater unit 138, and within which are the chambers 166 and 173. Chamber 282 communicates with chamber 173 by means of the latter's open bottom, and it communicates with the chambers 280 and 281 through the vapor separators 274 to 277, inclusive, as hereinafter described.

Adjacent the wall plate 29 in the floor plate 270 is a flanged opening 283 to which is suitably attached one end of a pipe elbow connection 284, while the remaining end of the latter is attached to the inside of the wall plate 29 in communication with the flanged opening 77. By these means the flanged opening 77 is communicated with the chamber 282.

Each of the vapor separators 274 to 277, inclusive, is provided with a flanged opening 285 in its bottom in close proximity to its adjacent wall plate, and suitably attached to which is a pipe 286 by means of a pipe union coupling 287. The pipe 286 in each case is suitably attached to its adjacent wall plate by means of a clamp bracket 288. The lower end of the pipe 286 is U shaped to form a trap 289.

In Figs. 11, 12, and 13 is shown the typical detail structure of the vapor separator units 249 to 252, inclusive, and 274 to 277, inclusive. Only one end of a unit is shown but, as will be explained, this is sufficient disclosure to a clear understanding of the complete units. The different units vary only slightly one from another, and this mainly in overall dimensions and attaching means. Each vapor separator unit comprises the following elements: Extending full length of the separator is a top plate 290, an intermediate plate 291, a back plate 292, and a front and bottom plate 293. Each of these plates is suitably attached, as by brazing 294, at their ends to the end plates 295. The back plate 292 is also suitably attached, as by brazing 296 to the intermediate plate 291 and to the front and bottom plate 293. The intermediate plate 291 is further suitably attached, as by brazing 297 to the front upper edge of the front and bottom plate 293. In this manner a water-tight compartment 298 is formed full length in the bottom portion of the vapor separator. Near one end of the front and bottom plate 293 is a flanged opening hereinbefore referred to in the case of the first and second effect as flanged opening 263 and in the case of the third effect as flanged opening 285. The intermediate plate 291 is provided throughout its length with a large number of perforations 299, and also a series of slots 300 and holes 301 along the rear edge thereof, which communicate with the interior of the compartment 298. It will be noted from the structure so far described that a rectangular opening 302 is formed by the plates 290, 291, and 295. Within the opening 302 are vertically mounted a plurality of hook baffles 303, 304, and 305 so arranged as to form a plurality of tortuous passages through the opening 302. At the ends a plurality of hook baffles 303 are attached, as by means of rivets 306, directly to the end plates 295, each hook baffle 303 extending vertically full length between the top plate 290 and the intermediate plate 291, and formed along its unriveted edge in the form of a hook, or trough, 307. Between the end plate 295, the hook baffles 304 and 305 alternate one after another. Hook baffle 304 comprises a vertical mounting plate 308 attached at its rear upper and lower corners to the plates 290 and 291, respectively, by means of riveted brackets 309, and reenforced along its front edge by an angle 310 and a closed end angle 311. The closed ends 312 are riveted to the plates 290 and 291, while the angles 310 and 311 are riveted to each other and to the plate 308. To the plates 308 are riveted in pairs, one on each side thereof, the hook baffles 313 co-extensive with the said plates 308. Hook baffle 305 comprises a vertical mounting plate 314 attached along its upper and lower edges, respectively, by riveted brackets 315, to the plates 290 and 291. To the plates 314 are riveted in pairs, one on each side thereof, the hook baffles 316, co-extensive with the said plates 314. The hook baffles 313 and 316 have along their unriveted edges troughs 317 and 318, respectively. It will be noted that, as assembled the hook baffles 303, 313, and 316 have their troughed edges 307, 317, and 318, arranged alternately, when adjacent to one another, and all the troughed edges face outwardly. Furthermore all the troughed edges 307, 317, and 318 register either with a perforation 299 or the ends of a slot 300 as indicated on Fig. 11. Extending upward along the rear edge of the intermediate plate 291 and suitably attached thereto is a restraining baffle 319 with a forwardly facing hooked upper edge 320. Screw 321 indicates a means whereby the vapor separators may be suitably attached along their upper outside corners to their respective plate connections 253 or 278 of the different effects hereinbefore mentioned. Screw 322 indicates a means whereby the vapor separators suitably connect the baffle plates 205 and the plates 245 or 246 of the first and second effect as hereinbefore mentioned. Gaskets 323 are used to insure water tightness to the hereinbefore described compartments 254 and 255 of the first and second effects 21 and 22.

Referring now more particularly to Figs. 1 to 6, inclusive, we will describe the various pipes, connections, and accessories which serve and communicate the various elements of the evaporating and distilling apparatus 20 one with another.

Pump motor 324 is provided to actuate the distilling circulating water pump 325 having inlet 326 and outlet 327. Pipe 328 communicates the outlet 327 with the shut-off valve 329 attached to the inlet 330 of the condensate cooler 331. Condensate cooler 331 is provided with condensate inlet 332 communicated by means of pipe 333, shut-off valve 334, branch pipe 335 of pipe 336, check valve 337, and pipe 338 to outlet 339 of condensate pump 340 driven by motor 324. Condensate cooler 331 also is provided with condensate outlet 341 with communicating line pipe 342, shut-off valve 343, and lead-off pipe 344. A by-pass line communicating pipe 336 with pipe 344 comprises the branch pipe 345, shut-off valve 346, and pipe 347. Condensate cooler also is provided with outlet 348. Pipe 349 communicates outlet 348 with the flanged opening inlet 153 of the distilling condenser and feed heater combined unit 138.

Pump motor 350 is provided to actuate the evaporator feed pump 351 having inlet 352 and outlet 353. Outlet 353 by means of pipe 354, shut-off valve 355, and pipe 356 is communicated with the flanged opening 155 of the distilling condenser and feed heater combined unit 138.

Flanged opening 156 of the unit 138 by means of pipe 357 is communicated with inlet 358 of the drain cooler 359. The drain cooler 359 is further provided with outlet 360 which by means of pipe 361 is communicated with the inlet 362 of the air ejector condenser 363 which in turn is provided with the outlet 364. The outlet 364 by means of pipe 365 is communicated with the flanged inlet 130 of the vapor feed heater unit 113 of the second effect 22 which is also provided with the flanged outlet 128. The outlet 128 by means of pipe 366 is communicated with the flanged inlet 129 of the vapor feed heater unit 112 of the first effect 21 which is also provided with the flanged outlet 127. The outlet 127 by means of pipe 367, shut-off valve 368, feed regulator 369, and pipe 370 is communicated with the flanged inlet 71 on the bottom of the casing 24 of the first effect 21. The feed regulator 369 is provided with a pressure balance pipe line which communicates the interior of the feed regulator with the interior of the first effect 21 through the flanged openings 371 and 372 in the casing 24. This pressure balance pipe, in the upper half, comprises a pipe 373 communicating flanged opening 371 with a flanged opening 374 in the top of the feed regulator body, while in the lower half comprises a pipe 375 communicating a flanged opening 376 in the bottom of the feed regulator body with the flanged opening 372 in the casing 24. A gauge glass 377, together with shut-off valves 378 and 379 forms an intercommunication line between the two pipes 373 and 375.

Flanged outlet 180 of the strainer box 178 of the first effect 21 by means of pipe 380, shut-off valve 381, and pipe 382 is communicated with the inlet 383 of the feed booster pump 384 driven by the motor 385. Outlet 386 of the feed booster pump 384 by the means of pipe 387, shut-off valve 388, feed regulator 389, and pipe 390 is communicated with the flanged inlet 72 on the bottom of the casing 25 of the second effect 22. The feed regulator 389 is provided with a pressure balance pipe line 391 which communicates the interior of the feed regulator 389 with the interior of the second effect 22 through the flanged openings 392 and 393 in the casing 25. The pressure balance pipe line 391 comprises elements identical to those described hereinbefore for the feed regulator 369 and need not be further described or designated.

Flanged outlet 190 of the strainer box 188 of the second effect 22 by means of pipe 394, shut-off valve 395 and pipe 396 is communicated with the inlet 397 of the feed booster pump 398 driven by the motor 385. Outlet 399 of the feed booster pump 398 by the means of pipe 400, shut-off valve 401, feed regulator 402, and pipe 403 is communicated with the flanged inlet 73 on the bottom of the casing 26 of the third effect 23. The feed regulator 402 is provided with a pressure balance pipe line 404 which communicates the interior of the feed regulator 402 with the interior of the third effect 23 through the flanged openings 405 and 406 in the casing 26. The pressure balance pipe line 404 comprises elements identical to those described hereinbefore for the feed regulator 369 and need not be further described or designated.

Flanged outlet 195 of the strainer box 193 of the third effect 23 by means of pipe 407, shut off valve 408, and pipe 409 is communicated with the inlet 410 of the brine discharge pump 411 driven by the motor 350. The brine discharge pump 411 has outlet 412.

Each of the strainer boxes 178 and 188 is provided with a small flanged outlet 413 and 414 respectively, while pipe 409 has small inlet 415. Outlet 413 in strainer box 178 by means of pipe 416, shut off valve 417, pipe 418, and shut off valve 419 is communicated with inlet 415. Outlet 414 in strainer box 188 by means of pipe 420, shut off valve 421, and pipe 422 is communicated with pipe 418.

Flanged outlet 64 on top of the shell extension 61 of the first effect 21 by means of pipe 423, and Y pipe 424 is communicated with the two flanged inlets 93 in the evaporator heater head 83 of the second effect 22. The Y pipe 424 is provided with a small flanged inlet 425 which by means of pipe 426 is communicated with the flanged outlet 75 of the first effect 21.

Flanged outlet 65 on top of the shell extension 62 of the second effect 22 by means of pipe 427, and Y pipe 428 is communicated with the two flanged inlets 94 in the evaporator heater head 84 of the third effect 23. The Y pipe 428 is provided with a small flanged inlet 429 which by means of pipe 430 is communicated with the flanged outlet 76 of the second effect 22.

Flanged outlet 67 on top of the casing 26 has attached to it an air ejector unit 431 which communicates the outlet 67 with inlet 432 on top of the air ejector condenser 363. The air ejector unit 431 comprises a T pipe 433, control valves 434 and 435, air ejectors 436 and 437, and Y pipe 438. The air ejector unit 431 comprises also the two steam inlet pipes 439 and 440. The air ejector condenser is provided with a vent pipe 441.

Flanged outlet 78 on top of the casing 26 by means of pipe 442, flash chamber 443, and pipe 444 is communicated with the inlet 445 of the condensate pump 340.

Flanged outlet 95 on the head 82 of the first effect 21 by means of branched pipe 446, shut off valve 447, and pipe 448 is communicated with the inlet 449 of the tube nest drain pump 450 driven by the motor 451. Branched pipe 446 has branch outlet pipe 452 which by means of shut off valve 453, and pipe 454, is communicated with the inlet 455 of the drain regulator 456. The top of the drain regulator body has an outlet 457 which by means of elbow connection 458, and pipe 459, is communicated with an outlet connection 460 on the head 82 of the first effect 21. The bottom of the drain regulator body has an outlet 461 which by means of pipe 462 is communicated with a flanged outlet 463 on the branch outlet pipe 452. An outlet 464 on the tube nest drain pump 450 by means of pipe 465, shut off valve 466, and pipe 467 is communicated with pipe 454.

A flanged inlet 468 on the front upper part of the casing 24 by means of a flanged connection 469, shut off valve 470, pipe 471, and elbow connection 472 is communicated with an outlet 473 on the head 82 of the first effect 21.

Flanged outlet 96 on the head 83 of the second effect 22 by means of pipe 474 is communicated with the inlet 475 of the drain regulator 476. An outlet 477 on the drain regulator 476 by means of shut off valve 478, pipe 479, and elbow pipe 480 is communicated with a flanged inlet 481 on the head 84 of the third effect. The top of the drain regulator body 476 has an outlet 482 which by means of elbow connection 483, pipe 484, and connection 485 is communicated with the pipe 474 adjacent the head 83. The bottom of the drain regulator body 476 has an outlet 486 which by means of pipe 487 communicates with a flanged inlet 488 on the pipe 474.

A flanged inlet 489 on the front upper part of the casing 26 of the third effect has attached thereto a Y connection 490 with two inlets 491 and 492. Inlet 491 by means of shut off valve 493, pipe 494, and elbow connection 495 is communicated with an outlet 496 on the head 83 of the second effect 22. Inlet 492 by means of shut off valve 497, pipe 498, and elbow connection 499 is communicated with an outlet 500 on the head 84 of the third effect 23.

Flanged outlet 97 on the head 84 of the third effect 23 by means of pipe 501, shut off valve 502, and pipe 503 is communicated with an inlet 504 on the drain cooler front head 505. An outlet 506 on the rear head 507 of the drain cooler 359 by means of pipe 508, shut off valve 509, and T connection 510 is communicated with the inlet 511 of the drain regulator 512. Outlet 513 of the drain regulator 512 by means of shut off valve 514, and pipe 515 is communicated with a flanged inlet 516 on the flash chamber 443. The top of the drain regulator body 512 has an outlet 517 which by means of elbow connection 518, pipe 519, and elbow connection 520 is communicated with an inlet 521 in the head 84 of the third effect. The bottom of the drain regulator body 512 has an outlet 522 which by means of pipe 523 is communicated with a flanged inlet 524 in the pipe 525.

A branch outlet 526 on the pipe 501 by means of pipe 525, and shut off valve 527 is communicated with the T connection 510.

On the end wall plate 29 of the third effect the flanged outlet 77 by means of pipe 528, and elbow connection 529 is communicated with the flash chamber 443.

We will now describe the operation of our improved apparatus for evaporating and distilling sea water as used on board ships.

The sea water to be distilled is taken from the sea chest through the inlet 326 of the distilling circulating water pump 325, driven by the motor 324, and pumped through pipe 328 and open valve 329 to the condensate cooler 331. The condensate cooler 331 is a conventional type of heat interchanger in which heated condensate passes through an inner nest of tubes over and around which passes the cold sea water, thus extracting heat from the condensate and adding heat to the sea water.

From the condensate cooler 331 the sea water passes by way of pipe 349 to the inlet 153 in the head 139 of the distilling condenser in the third effect 23. The sea water enters the chamber 148, passes through the distilling condenser nest of tubes 157 to the chamber 149, thus serving its function as a cooling agent for the distilling condenser, and, emerging through outlet 154 a large part of the sea water is piped to a discharge overboard while that which is required for distilling purposes is circulated (by pipes not shown) to the inlet 352 of the evaporator feed pump 351 driven by the pump motor 350. Thence through the pipe 354, open valve 355, pipe 356, and inlet 155 to the chamber 150 in the head 139 of the distilling condenser and feed water heater 138 in the third effect 23. From the chamber 150 the distilling water continues onward through feed water heater nest of tubes 158, chamber 151, nest of tubes 159, and chamber 152 to outlet 156. The distilling water in passing through the nests of tubes 158 and 159 has acted as additional cooling means to the distilling condenser tubes 157, and in turn the distilling water has acquired additional heat in so doing.

Emerging through the outlet 156 the distilling water passes through the pipe 357 and the inlet 358 into the drain cooler 359. The drain cooler 359 is a conventional type of heat interchanger in which the distilling water passes over and around a series of tube nests to an outlet 360. Thence it passes through pipe 361 and inlet 362 to the interior of an air ejector condenser 363. The air ejector condenser 363 is also a conventional type of heat interchanger in which the distilling water makes a series of passes through nests of tubes and emerges at outlet 364.

From the air ejector condenser outlet 364 the distilling water continues through pipe 365 and inlet 130, to the chamber 126 in the head 115 of the vapor feed heater unit 113 of the second effect 22. The distilling water passes from the chamber 126, through the tube nest 133, to and through the chamber 125, through the tube nest 132, to and through the chamber 124, through the tube nest 131, to the chamber 123 having the outlet 128.

From the outlet 128 in the second effect vapor feed heater unit 113 the distilling water continues onward through the pipe 366 and inlet 129 to the chamber 126 in the head 114 of the vapor feed heater unit 112 of the first effect 21.

The distilling water passes from the chamber 126, through the tube nest 133, to and through the chamber 125, through the tube nest 132, to and through the chamber 124, through the tube nest 131, to the chamber 123 having the outlet 127.

Emerging from the outlet 127 in the first effect vapor feed heater unit 112 the distilling water passes through the pipe 367, open valve 368, feed regulator 369, pipe 370, and finally through the inlet 71 and the feed distributing box 176 on the bottom of the casing 24, the distilling water enters the interior of the first effect as a distilland, and it rises therein until, governed automatically by the feed regulator 369 which is preferably of a type of a valve controlled by a float and which is well known to those skilled in the art, the tubes of the first effect evaporator heater 79 are properly submerged.

In the passage of the distilling water from the sea chest to the interior of the first effect as just described, heat has been gradually accumulated therein from the condensate cooler 331, the distilling condenser and feed heater 133, the drain cooler 359, the air ejector condenser 363, the vapor feed heater 113, and the vapor feed heater 112. At the same time steam (usually exhaust steam from the ship's auxiliaries) is supplied to the inlets 92 of the head 82 of the evaporator heater 79 of the first effect. The steam passing through the inlets 92 enters the chamber 90, thence passes through the upper nest of tubes 98 to and through the rear chamber 107, through the lower nest of tubes 99 to the chamber 91 in the head 82. The steam in passing through the upper nest of tubes 98 and heating the outside surrounding distilland is largely condensed so that the lower nest of tubes 99 may be considerably less in effective discharge area and these tubes 99 are for the same reason sloped toward their discharging end for more efficient discharge. The resulting condensate emerging from the chamber 91 through the outlet 95 is withdrawn and distributed by the motor driven pump 450 governed by the drain regulator 456. Any air and inert gases accumulating in the chamber 91 are by-passed through the air baffle 532, outlet 473, pipe 471, open valve 470, and inlet 468 to the interior vapor chamber of the first effect 21.

The steam in passing through the tubes 98 and 99 heats the distilland sufficiently to cause vapor to rise which in so doing passes upward through the inlets 218 of the tortuous passageways in the vapor baffle nests 197 and 198. In passing through the baffle nests 197 and 198 the vapor impinges on the surfaces of the baffle sheets 201 to 206, inclusive, and tends to deposit the entrained water and this is gathered by the troughed edges of the baffle sheets and led to the ends thereof where it drops back into the main body of the distilland away from the area of vapor activity and thus avoids being carried along by the rising vapor. The vapor thus somewhat dried emerges from the outlets 219 of the vapor baffle nest 197 and 198 into the chambers 256 to 259, inclusive, the exit from each of which is the opening 302 in its respective one of the vapor separators proper 249 to 252, inclusive.

Passing through the openings 302 in the vapor separators proper 249 to 252, inclusive, the vapor has to traverse the numerous tortuous passageways therein formed by the hook baffles 303, 304, and 305, and is repeatedly contacted with their labyrinthine surfaces with the result that any remaining water in suspension in the vapor tends to deposit thereon and is gathered by the effect of the moving vapor into the individual troughed edges 307 whence by the action of gravity it flows downward through the various registering perforations 299, or the ends of the slots 300, into the water-tight compartments 298. In addition water that tends to settle on the intermediate floor plates 291 is prevented from being carried through by the restraining baffles 319 which gathers such water and deflects it through the slots 300 into the compartment 298. The water gathered into the compartments 298 discharges through the flanged outlets 263 in the bottom thereof and thence by way of the pipes 264 is returned to the main body of the distilland. The bottom of the pipes 264 end in an upturned portion that forms a trap 267 for a water seal against the direct passage of vapor through these pipes.

The dried vapor emerges from the vapor separators 249 to 252, inclusive, into the feed heater chamber 254 where it flows over and around the tubes 131, 132, and 133 of the first effect feed heater unit 112 thus heating the flowing distilling water within the tubes hereinbefore described. Passing through the chamber 254 the vapor emerges from the outlet 64 on top of the first effect casing 24, into and through the pipe 423, the Y pipe 424, and through the inlets 93 in the head 83 of the second effect evaporator heater 80.

The condensate formed from the vapor during the heating of the feed water as it passes through the first effect is collected in the bottom of the chamber 254 and is discharged therefrom through the outlet 260, into and through the pipe 261, the extension pipe 75, and the pipe 426, to and through the inlet 425 on the Y pipe 424, within which it mingles once again with the passing vapor just described.

Heated distilland, somewhat concentrated, is drawn from the first effect 21 to the second effect 22 through the screened outlet 68 in the bottom of the casing 24, strainer box 178, pipe 380, open valve 381, pipe 382, motor driven feed booster pump 384, pipe 387, open valve 388, feed regulator 389, pipe 390, inlet 72, and to and through the feed distributing box 182 on the bottom inside of the casing 25 of the second effect 22, and the distilland rises therein until, governed automatically by the feed regulator 389, the tubes of the second effect evaporator heater 80 are properly submerged.

The combined vapor and hot condensate from the first effect which have entered through the inlets 93 into the second effect evaporator heater 80 passes therethrough in a manner identical to that described for the steam passing through the heater 79 of the first effect, thus heating the outside surrounding distilland, and the vapor being largely condensed is discharged along with the entering condensate as a condensate through the outlet 96 in the head 83. Thence this condensate is passed to the third effect evaporator heater 81 through the pipe 474, drain regulator 476, open valve 478, pipes 479 and 480, to the inlet 481 on the head 84.

Any air and inert gases accumulating in the chamber 91 are by-passed through the air baffle 532, outlet 496, pipe 494, open valve 493, Y connection 490, and inlet 489 on the front upper part of the casing 26, to the interior vapor chamber of the third effect 23.

The combined vapor and hot condensate from the first effect while passing through the second effect evaporator heater 80 causes vapor to rise within the second effect which, in a manner similar to that described for the rising vapor in the first effect, passes through the vapor baffle nests 199 and 200 and is partially dried, and the gathered entrained water is similarly returned to the main body of distilland.

Baffle plate 220 has been provided in the second effect adjacent the wall 30 to act as a local ebullition deflector.

The somewhat dried vapor emerges from the baffle nests 199 and 200 and continues onward through the chambers 256 to 259, inclusive, through the vapor separators proper 249 to 252, inclusive, to the chamber 255. The water gathered by the compartments 298 to the vapor separators proper 249 to 252, inclusive, is returned to the main body of the distilland through the pipes 264.

The vapor flowing through the chamber 255 passes over and around the tubes 131, 132, and 133 of the second effect feed heater unit 113 thus heating the distilling flowing water within the tubes hereinbefore described. Passing through the chamber 255 the vapor emerges from the outlet 65 on top of the second effect casing 25 into and through the pipe 427, the Y pipe 428, and through the inlets 94 in the head 84 of the third effect evaporator heater 81.

The condensate formed from the vapor during the heating of the feed water as it passes through the second effect is collected in the bottom of the chamber 255 and is discharged therefrom through the outlet 260, into and through the pipe 261, the extension pipe 76, and the pipe 430, to and through the inlet 429 on the Y pipe 428 within which it mingles once again with the passing vapor just described.

Heated distilland, somewhat further concentrated, is drawn from the second effect 22 to the third effect 23 through the screened outlet 69 in the bottom of the casing 25, strainer box 188, pipe 394, open valve 395, pipe 396, motor driven feed booster pump 398, pipe 400, open valve 401, feed regulator 402, pipe 403, inlet 73, and to and through the feed distributing box 192 on the bottom inside of the casing 26 of the third effect 23, and the distilland rises therein until, governed automatically by the feed regulator 402, the tubes of the third effect evaporator heater 81 are properly submerged.

The combined vapor and hot condensates from the second effect which have entered through the inlets 94 and 481 into the third effect evaporator heater 81 passes therethrough in a manner identical to that described for the steam passing through the heater 79 of the first effect, thus heating the outside surrounding distilland, and the vapor being largely condensed is discharged along with the entering condensates through the outlet 97 in the head 84. Any air and inert gases accumulating in the chamber 91 are by-passed through the air baffle 532, outlet 500, pipe 498, open valve 497, Y connection 490, and inlet 489 on the front upper part of the casing 26, to the interior vapor chamber of the third effect 23.

The combined vapor and hot condensates from the second effect while passing through the third effect evaporator heater 81 causes vapor to rise within the third effect which, in a manner similar to that described for the rising vapor in the first effect, passes through the vapor baffle nests 223 and 224 and is partially dried, and the gathered entrained water is similarly returned to the main body of distilland. The spray baffle 232 in this effect has the same function as that described for the spray baffle 220 of the second effect. The somewhat dried vapor emerges from the baffle nests 223 and 224 and continues onward through the chambers 280 and 281, through the vapor separators proper 274 to 277, inclusive, to the chamber 282. The water gathered by the compartments 298 of the vapor separators proper 274 to 277, inclusive, is returned to the main body of the distilland through the pipes 286.

The vapor flowing through the chamber 282 is drawn toward the chamber 166 and in so doing passes over and around the tubes 159 of the feed heater passes of the third effect distilling condenser and feed heater combined unit 138, and, continuing upward the vapor passes over and around all those tubes 157 of the unit 138 that lie to each side of and beneath the air baffles 168 and 169. The vapor deflected by the air baffles 168 and 169 is drawn to and passes through the air ports 174 in the air baffles 168 and 169 to the chamber 173. This flowing of the vapor over and around the tubes 157 is further aided by the baffle plate 175 which fits closely about the inner ends of the tubes 157 and thus prevents a flow of low resistance around these ends. The vapor flows from each end of the chamber 173, over and around the portions of the tubes 157 which lie within the triangular chamber 173, to and through the outlet 67 on top of the casing 26.

The condensate formed from the vapor during the heating of the feed water and the cooling by the distilling condenser is collected in the bottom of the chamber 282 and is discharged therefrom through the outlet 283, into and through the pipe 528 to the flash chamber 443.

The condensate that has been discharged from the outlet 97 in the head 84 of the third effect evaporator heater 81 passes by way of the pipe 501, open valve 502, and pipe 503, to and through tubes within the drain cooler 359, and thence by means of pipe 508, open valve 509, T connection 510, drain regulator 512, open valve 514, and pipe 515 to the flash chamber 443.

The condensates that pass into the flash chamber 443 from the third effect evaporator heater 81 and from the distilling condenser and feed water heater combined unit 138 liberate flash vapors which rise by means of pipe 442 to and through the inlet 78 on top of the casing 26 to the interior chamber 282 of the third effect 23.

The vapor that emerges from the third effect through the outlet 67 on top of the casing 26 is drawn therefrom by the air ejector 431. The air ejector 431 is of a design, well known in the art, in which a steam jet (fed usually from an auxiliary steam line not shown) functions to tend to create a vacuum which by reason of the intercommunicative relationship of the different effects comprising the apparatus 20 exerts its influence throughout the extent of the apparatus in such a manner that flow of vapor within the apparatus is constantly in the direction of the outlet 67 to the air ejector 431. By reason of the pressure and temperature differentials thus established between the first effect and the third effect the flow of feed water toward the third effect is aided, and low pressure evaporation in the different effects is maintained. The air ejector 431 discharges by way of the pipe 438 into the air ejector condenser 363, where, in a manner well known to the art, the non-condensing vapors are exhausted to the atmosphere, through the vent pipe 441, and the condensate is discharged to the ship's drain tank by a pipe 30.

The distilland in the third effect becomes surcharged with salt and is pumped overboard and replaced by the normal feed water as hereinbefore described. The distilland is drawn from the third effect 23 through the screened outlet 70 in the bottom of the casing 26, strainer box 193, pipe 407, open valve 408, pipe 409, motor driven brine discharge pump 411, and pump outlet 412 to the sea.

For the purpose of draining the distilland from the first and second effects, when so desired, a drainage line connects the brine discharge pump 411, with the strainer boxes 178 and 188 of the first and second effects, respectively. That from the first effect strainer box 178 is by way of pipe 416, valve 417, pipe 418, valve 419, and pipe 409 to the brine discharge pump 411. That from the second effect strainer box 188 is by way of pipe 420, valve 421, and pipe 422 which is a branch of pipe 418. It will now be clear that by proper manipulation of the shut-off valves 408, 419, 421, and 417 any combination of effects may be made, either individually or collectively, for drainage by the brine discharge pump 411.

Certain piping shown on the drawings and set forth in the specification but not included in the operation description have special, or emergency utility, of which a brief description will make clear to those skilled in the art.

The condensate discharge line from the first effect evaporator heater 79 has the piping arrangement, as set forth hereinbefore, controlled by three valves 447, 453, and 466, which by proper manipulation controls the passage of the condensate from the heater 79 either through the pump 450 or by-passes it around the pump. The condensate discharge line from the third effect evaporator heater 81 has the piping arrangement, as set forth hereinbefore, controlled by three valves 502, 509, and 527, which by proper manipulation controls the passage of the condensate from the heater 81 either through the drain cooler 359 or by-passes it around the drain cooler. The condensate discharge line leading from the condensate pump 340 has the piping arrangement, as set forth hereinbefore, controlled by three valves 334, 343, and 346 which by proper manipulation controls the passage of the condensate from the pump 340 either through the condensate cooler 331 or by-passes it around the condensate cooler.

At various points on the apparatus provisions have been made for small pipe connections to which various well known devices such as relief valves, test thermometers, test vacuum gauges, sample valves, and the like may be connected but which are not necessary features of this invention and need not be shown or described in detail. Also the gauge board 531 shown on the rear upper half of the casing 25 need not be described.

Fig. 14 has been included in the drawings as an aid in understanding the successive flow of liquids and gases through our apparatus. By reason of the limitations of a diagrammatic drawing it is to be understood that structural relationship must be studied from the Figs. 1 to 13, inclusive.

It will now be apparent that we have devised a novel apparatus for evaporating and distilling, especially applicable to marine purposes but it will be manifest that it is useful and valuable for application to other fields. It will be readily seen from the above description that we have devised a novel heat exchange apparatus whereby the surface areas subject to heat radiation losses are reduced to a minimum by placing condensers, distillers, heaters, and the like within a single container. We have made a considerable saving in the cost and weight of individual containers and piping required; all of which makes for general compactness of design with the consequent saving in space and weight—thus complying with the most valuable desideratum in the ship building art.

It is also apparent that the container shells could be of other shape then as shown and described without departing from the spirit of our invention, but we have shown it in our preferred form as being substantially cylindrical and horizontal. In this form it combines practicability with a maximum of container volume and structural strength for a minimum requirement of space and weight.

Although we have described and illustrated our invention in considerable detail, we do not wish to be limited to the exact and specific details thereof as shown and described, but may use such modification in, substitution for an equivalent thereof, as are embraced within the scope of our invention or as pointed out in the claims.

Having thus described our invention, what we claim as new and desire to secure by Letters Patent is:

1. In an evaporating and distilling apparatus of the type provided with a source of feed liquid and a source of primary heating fluid and having outgoing means for condensates formed in said apparatus, a unitary structure comprising, a plurality of evaporating units, and a distilling unit, said units being separably joined together in series relationship along a horizontal axis with said distilling unit at one end thereof, each of said units comprising a liquid vaporizing chamber and a vapor collecting chamber intercommunicated by fluid conveying means, each of said vapor collecting chambers having a condensate collecting means, fluid conveying means communicating at its inlet in the vapor collecting chamber of said distilling unit with said source of feed liquid and passing successively through the vapor collecting chamber of said distilling unit and the vapor collecting chambers of said evaporating units to an outlet in the liquid vaporizing chamber of the end evaporating unit at the remaining end of said axis, fluid conveying means communicating said liquid vaporizing chambers one with another for feed liquid transfer purposes, fluid conveying means communicating at its inlet with said source of primary heating fluid and passing through the liquid vaporizing chamber of said end evaporating unit to an outlet therein communicating with a said condensate outgoing means, and for each successive unit after said end evaporating unit fluid conveying means communicating at its inlet with the vapor collecting chamber of the preceding unit and passing through the liquid vaporizing chamber of said successive unit to an outlet therein communicating with a said condensate outgoing means, fluid conveying means communicating the condensate collecting means in each of said vapor collecting chambers with a said condensate outgoing means, and vapor exhausting means in operable communication with the vapor collecting chamber of said distilling unit.

2. A multiple effect distillation structure comprising a plurality of shells of substantially cylindrical section disposed end-to-end in horizontal axial alignment, end wall means disposed between said shells and separating them into aligned adjacent compartments, heating means in the lower portion of each of said compartments comprising heating fluid carrying ducts extending inwardly from and removable laterally through an opening in the cylindrical wall of such compartment, condenser means in each of said compartments above the heater means therein comprising cooling liquid carrying ducts extending inwardly from and removable through an opening in an exposed wall of such compartment, each of said compartments containing a condensate collecting means, means for conveying the condensate formed in said condensate collecting means to the exterior of said compartments, means for passing a liquid to be distilled through the cooling liquid ducts of the condensers of the successive compartments in series from end-to-end of said structure and then into the lower portion of one end compartment of the structure, means for supplying heating fluid to the heater means of said end compartment whereby the liquid is partly evaporated therein, means for conducting unevaporated liquid from each successive compartment beginning with said end compartment to the next adjacent compartment, and means for conducting the uncondensed vapor evolved in each successive compartment except a last compartment beginning with said end compartment to the ducts of the heater means of the next adjacent compartment, the uncondensed vapors evolved in said last compartment being exhausted therefrom by a vapor exhausting means.

BENJAMIN FOX.
CHARLES E. ERICSON.